May 30, 1933. W. MOLLS 1,911,919
TRAP
Filed March 22, 1932 3 Sheets-Sheet 2

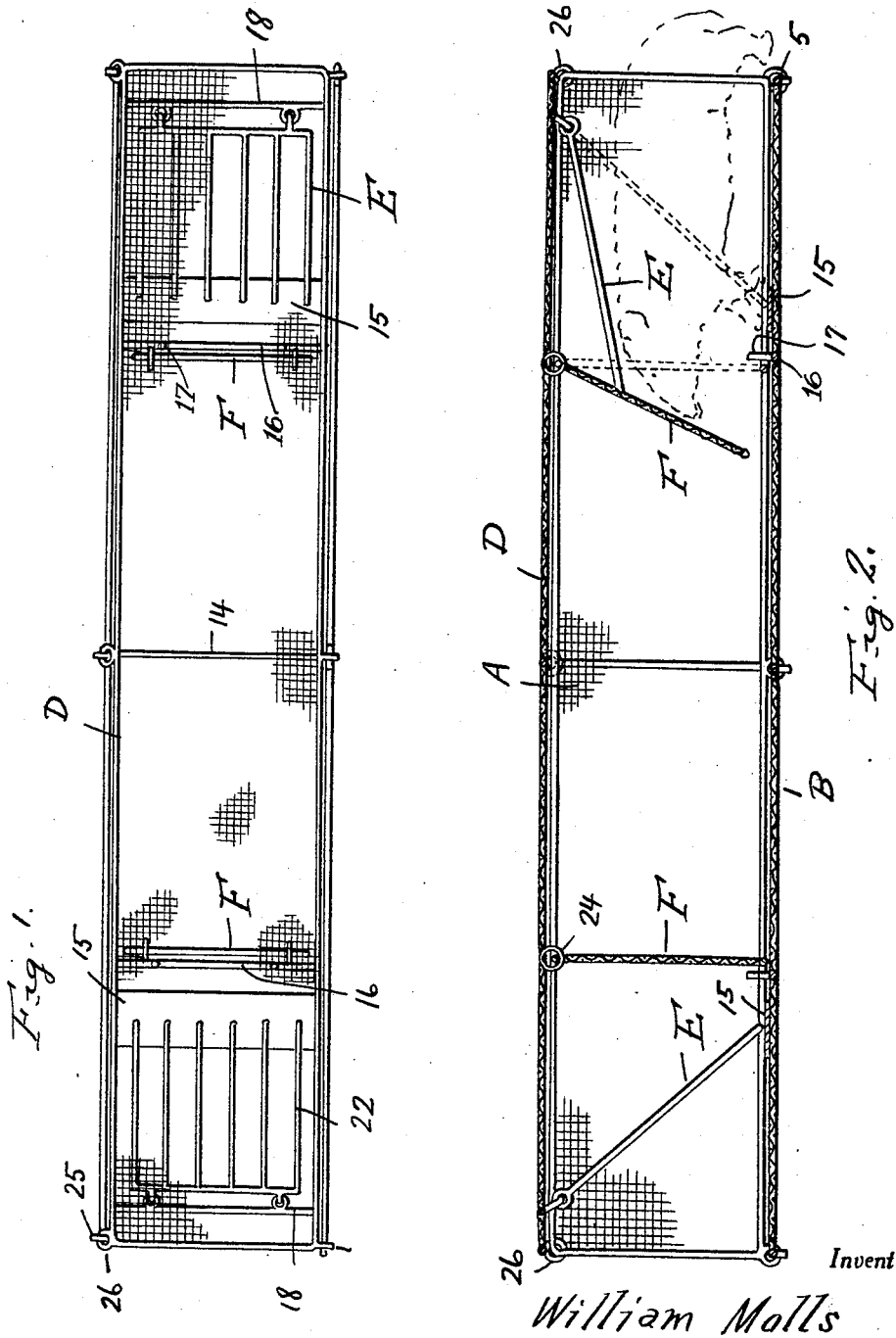

Inventor
William Molls
By Clarence A. O'Brien
Attorney

May 30, 1933.  W. MOLLS  1,911,919
TRAP
Filed March 22, 1932   3 Sheets-Sheet 3

Inventor
William Molls
By Clarence A. O'Brien
Attorney

Patented May 30, 1933

1,911,919

UNITED STATES PATENT OFFICE

WILLIAM MOLLS, OF TURTLE LAKE, WISCONSIN

TRAP

Application filed March 22, 1932. Serial No. 600,547.

The present invention relates to a trap to be used primarily for muskrats.

The object of the invention is to provide a trap of this nature of an efficient character which may be collapsed into a small compass so as to facilitate shifting and for the attainment of other analogous purposes.

A further important object of the invention resides in the provision of a trap of this nature which is simple in its construction, inexpensive to manufacture, easy to handle, effective and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of a trap embodying the features of my invention.

Figure 2 is a vertical longitudinal section therethrough.

Figure 3:
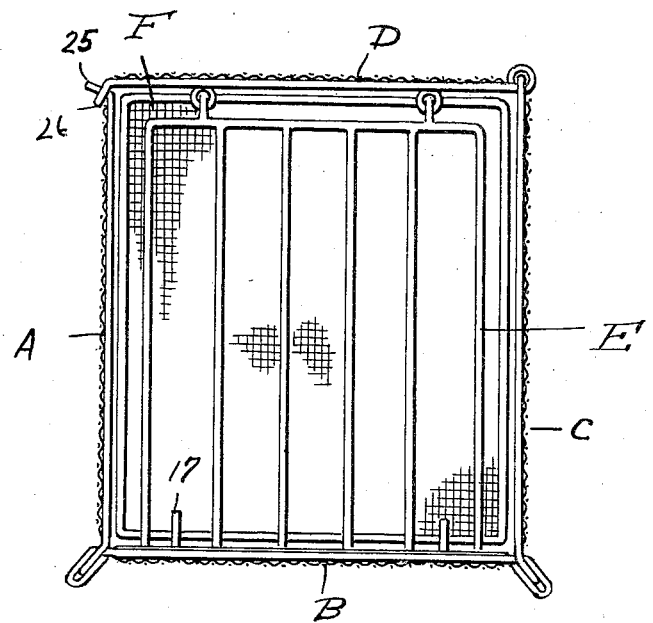
Figure 3 is an end elevation thereof.

Referring to the drawings in detail it will be seen that the trap comprises four sections A, B, C and D. These sections comprise rectangular frames 1, 2, 3 and 4 respectively connected together at their ends by suitable eyes 5 and at intermediate portions by similar eyes 6. Screened sheets 7, 8, 9 and 10 are mounted on the respective frames 1, 2, 3 and 4. The frames are provided with intermediate cross rods 11, 12, 13 and 14 respectively. Across the frame 2 is disposed a pair of plates 15 equidistant from the ends of the frame. Spaced inwardly from each plate 15 and across the frame 2 is a rod 16 having upstanding pins 17. Across the end portions of the frame 4 are rods 18 closer to the ends of the frame 4 than the plates 15 are to the ends of plate 2. These cross rods 18 are formed with eyes 19 with which are engaged eyes 20 on trap doors denoted generally by the letter E and comprising a cross bar 21 from which projects a plurality of tines 22 the ends of which are adapted to rest on the plates 15 so that the tines incline downwardly and inwardly. Doors F are swingably connected to the sheet 10 of frame 4 by suitable means 24 and are adapted to swing inwardly but are prevented from swinging outwardly by the stop pins 17.

Figure 5:
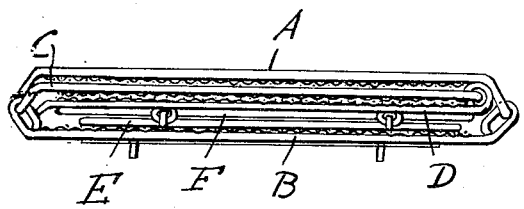
Figure 5 is an end elevation of the trap collapsed or folded.
Figure 4:
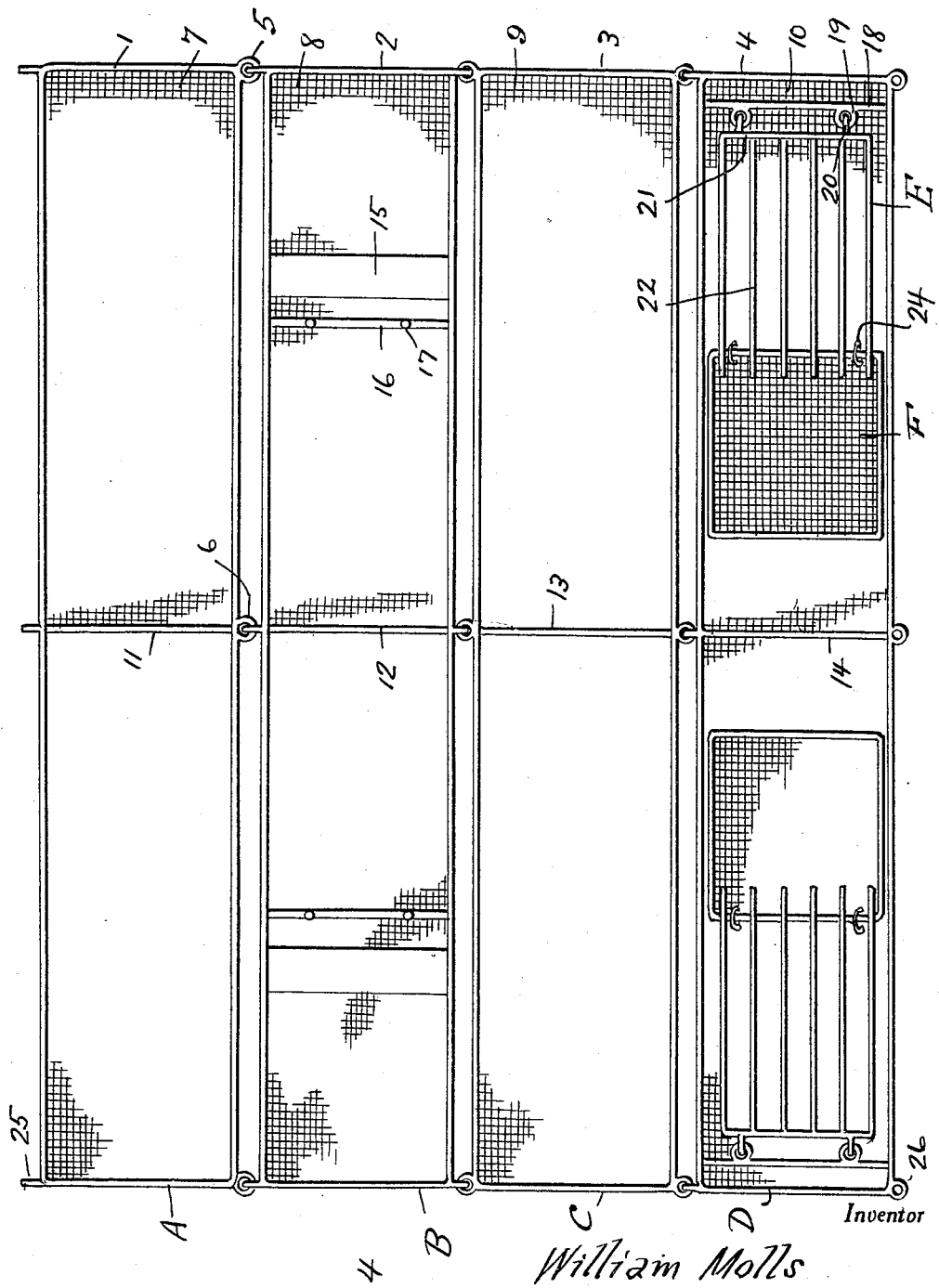
Figure 4 is a plan view showing the four sections of the trap extended in the same plane.

The section B forms the bottom section, sections A and C form the upstanding side sections and the section D forms the top section which is detachably connected with the side section A by the section A having pins 25 engageable in eyes 26. It will readily be appreciated that from the operative positions shown in Figures 1, 2 and 3 the sections may be folded one on top of the other as is illustrated in Figure 5 to form a small bundle for ease of transportation and for storage purposes.

The muskrat or other animal enters as indicated in dotted lines in Figure 2 pushing up the door E and the tines will prevent the muskrat from backing out and he will enter further and swing inwardly the door F and become trapped inside the structure.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

Having thus described my invention, what I claim as new is:

1. A trap of the class described comprising four frames, each having a foraminous sheet attached thereto and said frames forming two sides, a top, and a bottom of the trap, means for hingedly connecting the frames together, one of the outermost frames having eyes on its outer edge and the other outermost frames having projections on its outer edge for engaging said eyes to detachably connect said outermost frames together, a transverse strip carried by the bottom forming frame and located an appreciable distance from one end of said frame, a transverse bar carried by said bottom forming frame, and spaced slightly inwardly from the strip, said bar having upstanding projections thereon, a gate pivotally connected to the top forming frame adjacent one end of said frame, said gate including spaced longitudinally extending bars, the ends of which will rest upon the strip when the gate is in closed position with the gate in a diagonal position and sloping downwardly and inwardly from the top frame, a second gate pivotally connected to the top forming frame and spaced an appreciable distance inwardly from the first gate, the pivotal point of the second gate being arranged substantially in vertical alinement with the projections on the bar with the lower end of said second gate resting against the inner edges of said projections under the action of gravity and means for closing that end of the trap which is remote from the end at which the gates are located.

2. A trap of the class described comprising four frames, each having a foraminous sheet attached thereto and said frames forming two sides, a top, and a bottom of the trap, means for hingedly connecting the frames together, one of the outermost frames having eyes on its outer edge and the other outermost frames having projections on its outer edge for engaging said eyes to detachably connect said outermost frames together, a transverse strip carried by the bottom forming frame and located an appreciable distance from one end of said frame, a transverse bar carried by said bottom forming frame, and spaced slightly inwardly from the strip, said bar having upstanding projections thereon, a gate pivotally connected to the top forming frame adjacent one end of said frame, said gate including spaced longitudinally extending bars, the ends of which will rest upon the strip when the gate is in closed position with the gate in a diagonal position and sloping downwardly and inwardly from the top frame, a second gate pivotally connected to the top forming frame and spaced an appreciable distance inwardly from the first gate, the pivotal point of the second gate being arranged substantially in vertical alinement with the projections on the bar with the lower end of said second gate resting against the inner edges of said projections under the action of gravity and means for closing that end of the trap which is remote from the end on which the gates are located, such means comprising a pair of gates similar to the gates at the opposite end of the trap, a bottom strip against which the outer gate of the second set rests, and a transverse bar connected to the bottom frame and having projections against which the second gate of the second set rests when in closed position.

In testimony whereof I affix my signature.

WILLIAM MOLLS.